(12) United States Patent
Abramovitch et al.

(10) Patent No.: US 9,678,103 B2
(45) Date of Patent: Jun. 13, 2017

(54) AUTOMATIC TUNING OF ATOMIC FORCE MICROSCOPE

(75) Inventors: Daniel Y Abramovitch, Palo Alto, CA (US); Christopher Ryan Moon, Cupertino, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 1153 days.

(21) Appl. No.: 13/283,756

(22) Filed: Oct. 28, 2011

(65) Prior Publication Data

US 2013/0110262 A1 May 2, 2013

(51) Int. Cl.
| | |
|---|---|
| *G05B 13/02* | (2006.01) |
| *G01Q 10/06* | (2010.01) |
| *B82Y 35/00* | (2011.01) |
| *G01Q 20/02* | (2010.01) |
| *G01Q 60/24* | (2010.01) |

(52) U.S. Cl.
CPC ............ *G01Q 10/065* (2013.01); *B82Y 35/00* (2013.01); *G01Q 20/02* (2013.01); *G01Q 60/24* (2013.01)

(58) Field of Classification Search
CPC ...... B82Y 35/00; G01Q 10/065; G01Q 20/02; G01Q 60/24
USPC .......................................... 700/42, 37; 850/4
See application file for complete search history.

(56) References Cited

U.S. PATENT DOCUMENTS

| | | | |
|---|---|---|---|
| 5,406,496 A * | 4/1995 | Quinn | 702/106 |
| 5,986,381 A | 11/1999 | Hoen et al. | |
| 6,810,291 B2 * | 10/2004 | Card et al. | 700/48 |
| 7,513,142 B2 | 4/2009 | Rice et al. | |
| 7,719,214 B2 * | 5/2010 | Leehey et al. | 318/34 |
| 7,987,006 B2 | 7/2011 | Abramovitch et al. | |
| 2005/0069050 A1 * | 3/2005 | Ding et al. | 375/296 |
| 2006/0225490 A1 | 10/2006 | Xi et al. | |
| 2008/0000292 A1 | 1/2008 | Abramovitch | |
| 2009/0062935 A1 * | 3/2009 | Abramovitch et al. | 700/42 |
| 2011/0074330 A1 * | 3/2011 | Ellis et al. | 318/561 |

FOREIGN PATENT DOCUMENTS

| | | |
|---|---|---|
| JP | 2004101202 A | 2/2004 |
| JP | 2008014943 A | 1/2008 |
| WO | 2009070119 A1 | 6/2009 |
| WO | 2012115653 A1 | 8/2012 |
| WO | 2012118483 A1 | 9/2012 |

OTHER PUBLICATIONS

Laughton, M.A. and Warne, D.F. Electrical Engineer's Reference Book (16th Edition) 2003 Publisher: Elsevier p. 13/52.*

(Continued)

*Primary Examiner* — Kenneth M Lo
*Assistant Examiner* — Yuhui R Pan (57) ABSTRACT

An atomic force microscope (AFM) comprises a physical system and a controller comprising a plurality of digital filters and configured to control the physical system. The AFM is tuned by performing automatic loop shaping on a loop response defined by a frequency response of the physical system and a frequency response of the controller, and adjusting a gain of the controller according to a peak in a magnitude of the loop response.

12 Claims, 10 Drawing Sheets

(56) References Cited

OTHER PUBLICATIONS

IEEE Transactions on Signal Processing, vol. 44, No. 6, Jun. 1996 "Weighted Least-Squares Design of Recursive Allpass Filters". Sunder S. Kidambi.*
Laughton, M.A. and Warne, D.F. "Electrical Engineer's Reference Book" (16th Edition) 2003, Publisher: Elsevier, p. 13/52.*
Sunder S. Kidamb, IEEE Transactions on Signal Processing, vol. 44, No. 6, Jun. 1996, "Weighted Least-Squares Design of Recursive Allpass Filters".*
Co-pending U.S. Appl. No. 12/890,894, filed Sep. 27, 2010.
Sidman, et al. "Parametric System Identification on Logarithmic Frequency Response Data", IEEE Transactions on Automatic Control, vol. 36, No. 9, Sep. 1991, pp. 1065-1070.
Abramovitch, et al. "Semi-Automatic Tuning of PID Gains for Atomic Force Microscopes", 2008 American Control Conference, Westin Seattle Hotel, Seattle, Washington, USA, Jun. 11-13, 2008, pp. 2684-2689.
Office Action dated Jul. 15, 2016 for Japanese Patent Application No. 2012-205898 (Unofficial/non-certified translation provided by foreign agent included).
English language machine translation of JP2004101202, published Feb. 4, 2004.
English language abstract of JP2008014943, published Jan. 24, 2008.
Notice of Allowance dated Feb. 3, 2017 in Japanese Application No. 2012-205898 (Unofficial/non-certified translation provided by foreign agent included).

* cited by examiner

AUTOMATIC TUNING OF ATOMIC FORCE MICROSCOPE

BACKGROUND

An atomic force microscope (AFM) captures an image by scanning a mechanical probe tip across a surface of a sample. The probe tip senses molecular forces or friction between the probe tip and the sample. This sensing can be performed in different ways according to different AFM modes. For example, in a contact mode, the probe tip is mounted on a cantilever that is deflected in response to the forces between the probe tip and the sample. This deflection is measured in order to translate the detected forces into a representation of the sample's surface features.

As the probe tip is scanned across the sample, it may require height adjustment in order to accurately track the surface topology. In general, the probe tip should be maintained close enough to the surface for accurate sensing, but not so close that the force between the tip and sample becomes large enough to damage the probe tip and the sample.

The height of the probe tip is adjusted by a controller having a feedback loop. The controller outputs a control signal to an actuator to move the probe tip up or down by a desired amount, and it receives a feedback signal through the feedback loop to determine any necessary adjustments to the control signal. Components located between the control signal and the feedback loop are referred to collectively as the physical system of the AFM. The feedback signal can indicate, for instance, a difference between the desired movement of the probe tip and actual movement of the probe tip. It can also indicate interactions between the probe tip and the sample.

To safely image a surface, the controller must be able to adjust the probe tip height in a timely and accurate manner as the probe tip is scanned along the sample surface. Otherwise, the probe tip may crash into the sample surface before the controller can make required adjustments. Consequently, a safe scanning speed of the probe tip is limited by the bandwidth of the controller feedback loop.

In many commercial AFM controllers, the feedback loop uses a proportional-integral (PI) filter or a proportional-integral derivative (PID) filter to update the control signal. Due to the simplicity of these filters, however, the feedback loop is unable to correct for higher order vibrational resonances that may affect the height of the probe tip. This inability to correct for higher order resonances means that the probe tip must be moved at a slower rate to provide stable operation. Moreover, most AFMs require a user to tune the parameters of the feedback loop, but most users cannot properly configure parameters required to correct for higher order resonances.

Academic control theorists have designed more sophisticated AFM controllers to increase the feedback bandwidth of the AFM, but these AFM controllers have significant weaknesses as well. These AFM controllers are typically designed by constructing an analytical model of an AFM system in a process referred to as system identification, and then generating a formula for an AFM controller that will satisfy some design goal with respect to the modeled AFM system. For example, an analytical model of an AFM system can be constructed by measuring the frequency response of the AFM system and then generating an equation that captures all of the complex-valued poles and zeros of the measured system. A formula for an AFM controller can then be generated based on the AFM system equation.

One weakness of academic-designed AFM controllers is that system identification is imprecise, so it produces a flawed analytical model of an AFM system. This can result in a theoretically optimal controller that performs poorly in practice. Another weakness of academically-designed AFM controllers is that the tools to perform system identification and subsequent controller design tend to fail for systems with many (possibly weakly damped) poles and zeros and with time delays, which is typical for AFMs.

Due to the above shortcomings of commercially available and academically-designed AFM controllers, most existing AFM controllers are designed with a great deal of human interaction and verification. In other words, there are no automatic methods for creating sophisticated and stable AFM controllers.

What is needed, therefore, are automatic methods for designing AFM controllers that are more sophisticated than traditional PI or PID based AFM controllers.

SUMMARY

In accordance with an example embodiment, a method is provided for tuning an AFM comprising a physical system and a controller configured to control the physical system. The method comprises determining a loop response of the AFM based on a frequency response of the physical system and a frequency response of the controller, determining a cost function indicating a difference between the loop response and a target response characteristic, and adjusting the frequency response of the controller to reduce the difference.

In accordance with another example embodiment, a method is provided for tuning an AFM comprising a physical system and a controller configured to control the physical system. The method comprises determining a frequency response of the controller based on a set of filter coefficients, determining a loop response of the controller and the physical system based on the determined frequency response of the controller and a measured frequency response of the physical system, aligning a magnitude of the determined loop response with a desired loop shape, determining a value of an error function between the aligned magnitude of the determined loop response and the desired loop shape, and adjusting the set of filter coefficients to improve the value of the error function.

In accordance with another example embodiment, a system is provided for tuning an AFM comprising a physical system and a controller comprising a plurality of digital filters and configured to control the physical system. The system comprises a loop shaping component that performs automatic loop shaping on a loop response defined by a frequency response of the physical system and a frequency response of the controller, and a gain adjustment component that adjusts a gain of the controller according to a local maximum magnitude of the loop response.

BRIEF DESCRIPTION OF THE DRAWINGS

The described embodiments are best understood from the following detailed description when read with the accompanying drawing figures. Wherever applicable and practical, like reference numerals refer to like elements.

DESCRIPTION OF EMBODIMENTS

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a', 'an' and 'the' include both singular and plural referents, unless the context clearly dictates otherwise. Thus, for example, 'a device' includes one device and plural devices.

The described embodiments relate generally to methods of tuning an AFM comprising a physical system and a controller that controls the physical system. In certain embodiments, the AFM is tuned by measuring a frequency response $P(\omega)$ of the physical system, and then adjusting a frequency response $C(\omega)$ of the controller such that a combined frequency response of the physical system and the controller satisfies some design goal. The combined frequency response, also referred to as a loop response, is defined as $L(\omega)=P(\omega)C(\omega)$. The design goal can be, for instance, maximizing bandwidth of the loop response $L(\omega)$ to account for higher order resonances in the physical system while keeping the AFM stable.

One way to achieve the desired bandwidth and stability is to first tune the controller response such that a magnitude $|L(\omega)|$ of the loop response matches a magnitude $|L_0(\omega)|$ of a desired loop shape, and then to adjust the gain of the controller to further improve the bandwidth of the loop response $L(\omega)$. The loop shape is defined as the relative structure of a response curve independent of its overall gain. For example, an integrator shape is given by $|L(\omega)|=k/w$.

The controller typically comprises a set of digital filters arranged in a cascaded configuration, and $C(\omega)$ is determined by coefficients of the filters. Accordingly, $L(\omega)$ can be calculated by first measuring $P(\omega)$ and then calculating $C(\omega)$ based on the filter coefficients. An example of a measured $P(\omega)$ is shown by a curve 805 in FIG. 8A, and an example of a calculated $C(\omega)$ is shown by a curve 810 in FIG. 8A. The calculation of $C(\omega)$ can be performed using the actual digital sample rate of the AFM and discrete-time expressions for the filters. Then, $L(\omega)$ can be accurately predicted at all frequencies for any set of controller coefficients. An example of a predicted loop response $L(\omega)$ is shown by a curve 815 in FIG. 8B, and an example of a desired loop response $L_0(\omega)$ is shown by a curve 820 in FIG. 8B.

With the ability to calculate $L(\omega)$, the filter coefficients in the AFM controller can be numerically optimized to minimize some cost function $\epsilon$ that related to a difference between $|L(\omega)|$ and $|L_0(\omega)|$. One example of the cost function is $\epsilon=\text{rms}[\delta(\omega)]$, where $\text{rms}[\delta(\omega)]$ is a root mean squared difference, or sum of squared differences, of a difference function $\delta(\omega)=20 \log_{10}(|L(\omega)|/L_0(\omega)|)$. An example of the difference function is shown by a curve 825 in FIG. 8C.

The difference function $\delta(\omega)$ is typically calculated for logarithmic values of $L(\omega)$ and $L_0(\omega)$ because these functions span many orders of magnitude. An example of using logarithmic scaling in the curve fitting, as well as using the magnitude response for the curve fit, is described in Sidman et al., "Parametric System Identification on Logarithmic Frequency Response Data," IEEE TRANSACTIONS ON AUTOMATIC CONTROL, VOL. 36, No. 9, September 1991, the subject matter of which is hereby incorporated by reference. In general, the use of logarithmic scaling allows $\epsilon$ to be equally weighted across many decades of frequency, while $P(\omega)$ is measured at logarithmically spaced frequencies. As a result, controller optimization can be performed by a standard multi-parameter fit of $\log_{10}(L(\omega))$ to $\log_{10}(L_0(\omega))$ evaluated at the measured values of $\omega$.

Figure 8:
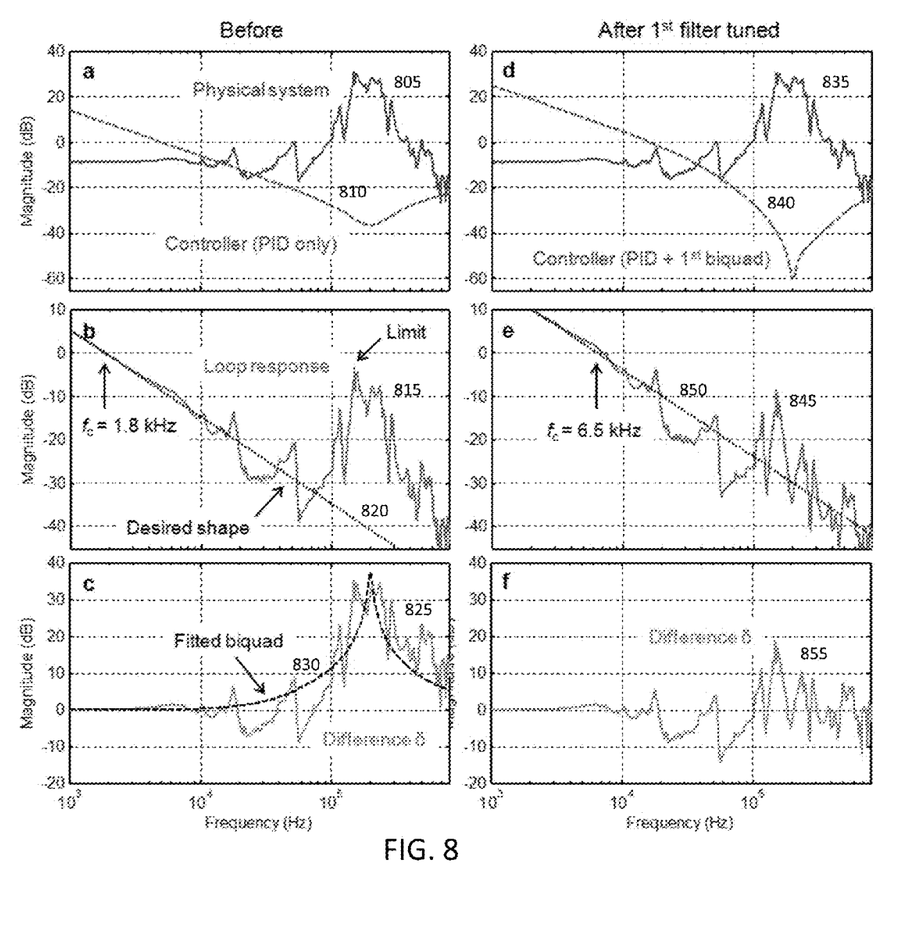
FIGS. 8A through 8F are graphs illustrating various AFM characteristics related to the methods of FIGS. 5 through 7 according to representative embodiments.

After computing $\delta(\omega)$, a filter can be fitted to the difference function, as illustrated by a curve 830 in FIG. 8C. The fitted filter can then be inverted and appended to the controller, as illustrated by a curve 840 in FIG. 8D. As used herein, the term "append" can refer broadly to a modification of the controller to reflect additional filter response characteristics. Such a modification can be made, for example, by modifying configurable hardware or software that defines the frequency response of the controller.

In shaping the loop response, the phase of $L(\omega)$ can sometimes be ignored because magnitude and phase are related. Bode's well known gain-phase relationship states that for a stable, minimum phase system (one with no poles or zeros in the unstable portion of the complex plane), the phase and gain are uniquely related. Thus, shaping $|L(\omega)|$ correspondingly shapes this part of the phase of $L(\omega)$. The presence of poles and or zeros in the unstable portion of the complex plane result in an excess of negative phase as does time delay. This extra negative phase due to time delay places a limit on the bandwidth of the controller even after $|L(\omega)|$ has been properly shaped.

After the magnitude is shaped, the overall gain of the controller is adjusted to achieve some design goal and/or given robustness margin. In adjusting the gain, the full loop response $L(\omega)$ is taken into account, including magnitude and phase. For example, the overall gain can be maximized subject to requirements on phase and gain margins, ensuring that the controller will be stable and robust. Alternatively, the gain can be tuned below its maximum value to achieve a desired crossover frequency or closed-loop bandwidth.

Unlike conventional methods, the above methods can be used to address higher order resonances by tuning the controller automatically. This can eliminate a need for user intervention or expert analysis, and it can allow more sophisticated AFM systems to be used.

Figure 1:
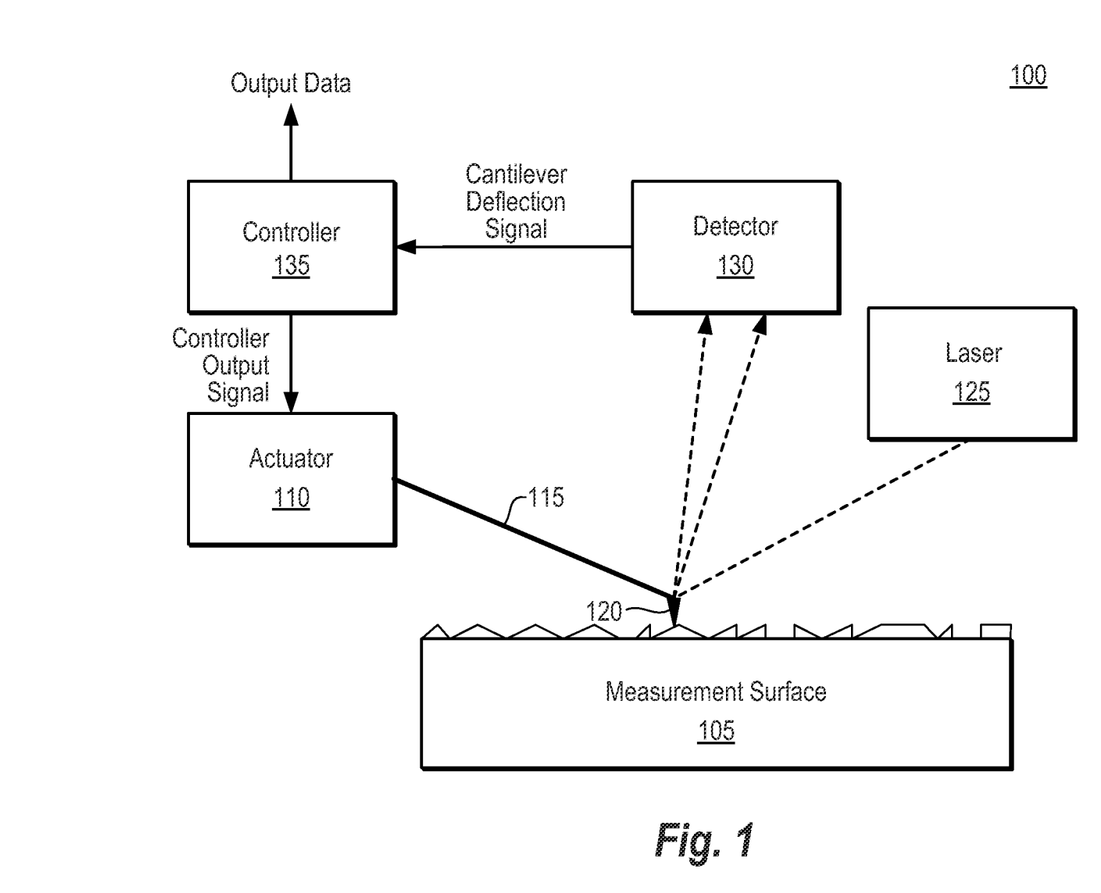
FIG. 1 is a block diagram of an AFM according to a representative embodiment.

FIG. 1 is a block diagram of an AFM 100 according to a representative embodiment. This embodiment represents one type of AFM in which described methods may be performed, and those skilled in the art will recognize that the described methods can be performed in other types of AFMs. In addition, although certain embodiments are described with respect to AFMs operating in a contact mode, the described embodiments may be adapted for use with other AFM modes, as will be apparent to those skilled in the art.

Referring to FIG. 1, AFM 100 comprises an actuator 110, a laser 125, a detector 130, and a controller 135. Actuator 110 is connected to a cantilever arm 115 having a probe tip 120, which are used to capture an image of a measurement surface 105. The image is captured by moving probe tip 120 relative to measurement surface 105 and detecting a deflection of cantilever arm 115 due to forces or interactions between probe tip 120 and measurement surface 105.

During image capture, actuator 110 moves cantilever arm 115 and probe tip 120 up or down with respect to measurement surface 105 to maintain a substantially constant force between probe tip 120 and measurement surface 105. In some embodiments, actuator 110 can be a piezoelectric actuator, for example, such as described in commonly owned U.S. patent application Ser. No. 12/890,894, filed on Sep. 27, 2010, entitled "Tandem Piezoelectric Actuator and Single Drive Circuit for Atomic Force Microscopy," to D. Schroeder, et al., the subject matter of which is hereby incorporated by reference. Alternatively, actuator 110 can be an electrostatic "nanostepper" actuator, for example, such as described in commonly owned U.S. Pat. No. 5,986,381 to S. Hoen et al., dated Nov. 16, 1999, entitled "Electrostatic Actuator with Spatially Alternating Voltage Patterns," the disclosure of which is hereby incorporated by reference.

Laser 125 (or another suitable light source) is disposed above measurement surface 105. It directs light that is reflected at cantilever arm 115 and is incident on detector 130. Detector 130 generates a deflection signal determined by an angle at which light is reflected off of cantilever arm 115 at probe tip 120, and it transfers the deflection signal to an analog-to-digital converter (ADC). The ADC digitizes the deflection signal to produce a cantilever deflection signal, which is transmitted to controller 135. The deflection signal indicates of movement of probe tip 120 in a Z-direction relative to measurement surface 105. In response to the deflection signal, controller 135 generates a controller output signal to actuator 110 via a digital-to-analog converter (DAC) to raise or lower the cantilever arm 115 and probe tip 120 to maintain a constant deflection equal to a deflection setpoint, leading to a constant force between probe tip 120 and measurement surface 105 in contact-mode.

Among other functions, controller 135 can be configured to account for resonance conditions that can occur when cantilever arm 115 is off measurement surface 105 ("off-surface resonance conditions"), as described in commonly owned International Application PCT/US11/26191, filed on Feb. 25, 2011, entitled "Atomic Force Microscopy Controller and Method" to C. Moon, the disclosure of which is hereby incorporated by reference.

Controller 135 can be implemented in whole or in part by a processing device, such as a processor or central processing unit (CPU), application specific integrated circuits (ASICs), field-programmable gate arrays (FPGAs), or combinations thereof, using software, firmware, hard-wired logic circuits, or combinations thereof. Details of certain aspects of the functions of controller 135 are provided below in connection with the representative embodiments. In some embodiments, controller 135 is implemented on a real-time operating system (OS) used in AFM 100 or as a standalone device. When using a processor or CPU, a memory (not shown) is included for storing executable software/firmware and/or executable code that controls the signal from controller 135 to actuator 110. The memory may be any number, type and combination of nonvolatile read only memory (ROM) and volatile random access memory (RAM), and may store various types of information, such as computer programs and software algorithms executable by the processor or CPU. The memory may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like.

For example, controller 135 can include an FPGA onto which hardware description language (such as Verilog or VHDL) code has been compiled and uploaded. The deflection signal from detector 130 is digitized by the ADC. Based on the deflection signal, the FPGA creates the controller output signal that emerges from the DAC, is amplified, and then provided to actuator 110. Controller 135 illustratively includes a proportional-integral-differential (PID) filter block and a series of digital biquadratic filters, for example, known to one of ordinary skill in the art. The PID filter block and the digital biquadratic filters of controller 135 have coefficients useful in establishing the filter characteristics, discussed below. The coefficients can be dynamically reconfigured to change the filter characteristics, such as by a remote computer (e.g. a computer hosting a graphical user interface for AFM 100 and communicating via a communication protocol, such as Ethernet). Alternatively, controller 135 can be tuned to automatically to compensate for the motor dynamics, as described in commonly owned U.S. Pat. No. 7,987,006 by D. Abramovitch et. al., which is hereby incorporated by reference.

The frequency response of controller 135 (controller response) is a function of the filter coefficients, and methods for calculating theoretical frequency responses for digital filters are well-known. Illustratively, the frequency responses of controller 135 can be calculated using known programming software (e.g., Matlab). For example, a notch filter for use in mitigating off-surface resonances of cantilever arm 115, as described by commonly owned International Application PCT/US11/26191 to C. Moon, which is hereby incorporated by reference, can be specified by a center frequency, a depth, and a width (quality (Q) or damping factor).

Figure 2:
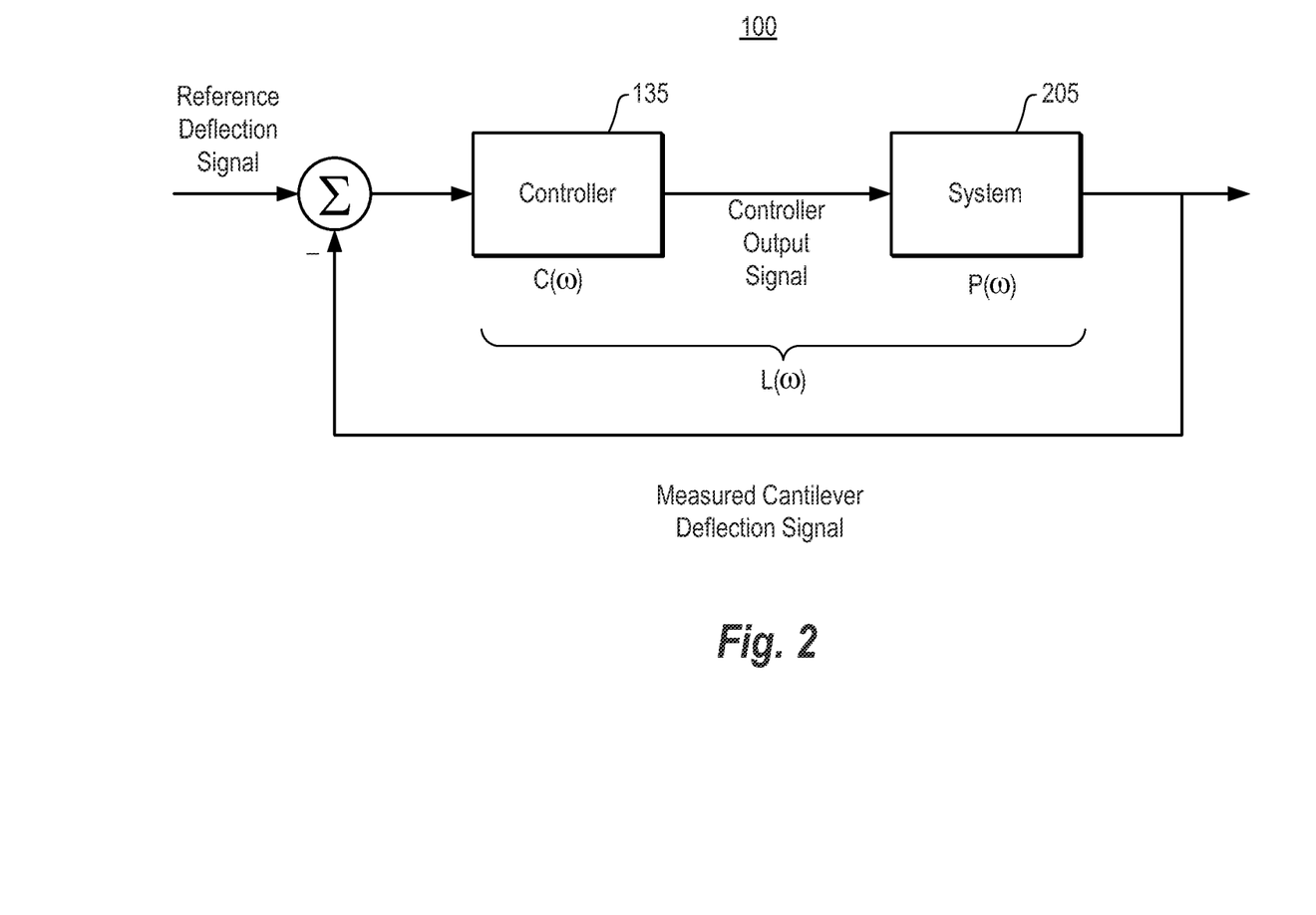
FIG. 2 is a simplified block diagram of the AFM of FIG. 1 according to a representative embodiment.

FIG. 2 is a simplified block diagram of AFM 100 of FIG. 1 according to a representative embodiment. Compared with FIG. 1, FIG. 2 represents a more general model of AFM characteristics. For instance, AFM 100 of FIG. 2 can detect the amount of deflection of a cantilever arm by various alternative types of sensors and is not limited to laser detection as shown in FIG. 1. Similarly, AFM 100 of FIG. 2 can control movement of a cantilever arm and probe tip using various alternative types of actuators.

Referring to FIG. 2, AFM 100 comprises controller 135 and a system 205. System 205 is an abstract, or "black box", representation of AFM components in a response pathway between the controller output signal generated by controller 135 and the cantilever deflection signal received by controller 135. System 205 generally comprises components such as actuators for controlling a cantilever arm in response to the controller output signal, and components such as sensors for detecting deflection of the cantilever arm and generating the cantilever deflection signal.

Controller 135 is characterized by a frequency response $C(\omega)$, and system 205 is characterized by a frequency response $P(\omega)$. Accordingly, an overall loop response $L(\omega)$ of AFM 100 can be defined as $L(\omega)=P(\omega) C(\omega)$, or $L=PC$. In some embodiments, $P(\omega)$ is measured directly, and then $C(\omega)$ is tuned by varying certain parameters of controller 135 to achieve a desired loop response $L(\omega)$. In some embodiments, the frequency response $P(\omega)$ can be measured using built-in capabilities of AFM 100. For example, controller 135 can apply a sine wave to system 205 as the controller output signal and then measure the resulting cantilever deflection signal to determine $P(\omega)$. For many electromechanical systems, such as an AFM, direct measurement of $P(\omega)$ is difficult and $P(\omega) C(\omega)$ is measured when the system is in closed-loop, or extracted from the closed-loop response, typically denoted by $T(\omega)=L(1+L)^{-1}$. From these combined measurements, $P(\omega)$ is extracted and $C(\omega)$ can be verified against the controller model.

The exact quantities involved in the calculation of frequency response $P(\omega)$ depend on the mode of AFM 100. For instance, in contact mode, $P(\omega)$ is the response of the cantilever deflection signal to the controller output signal. As illustrated by curve 805 in FIG. 8A, a typical frequency response $P(\omega)$ includes a forest of vibrational resonances that cannot be compensated by a simple PID or PI controller. Accordingly, to achieve a desired loop response $L(\omega)$, $C(\omega)$ should be designed to compensate for higher order resonances. This allows AFM 100 to appropriately adjust the height of probe tip 120 according to the higher order resonances, which can prevent unstable operation and possible damage to AFM 100, while also improving the accuracy of AFM 100. As will be described below, $C(\omega)$ can be tuned automatically, which avoids the need for expert system verification or tuning, as is required by many conventional systems.

Figure 3:
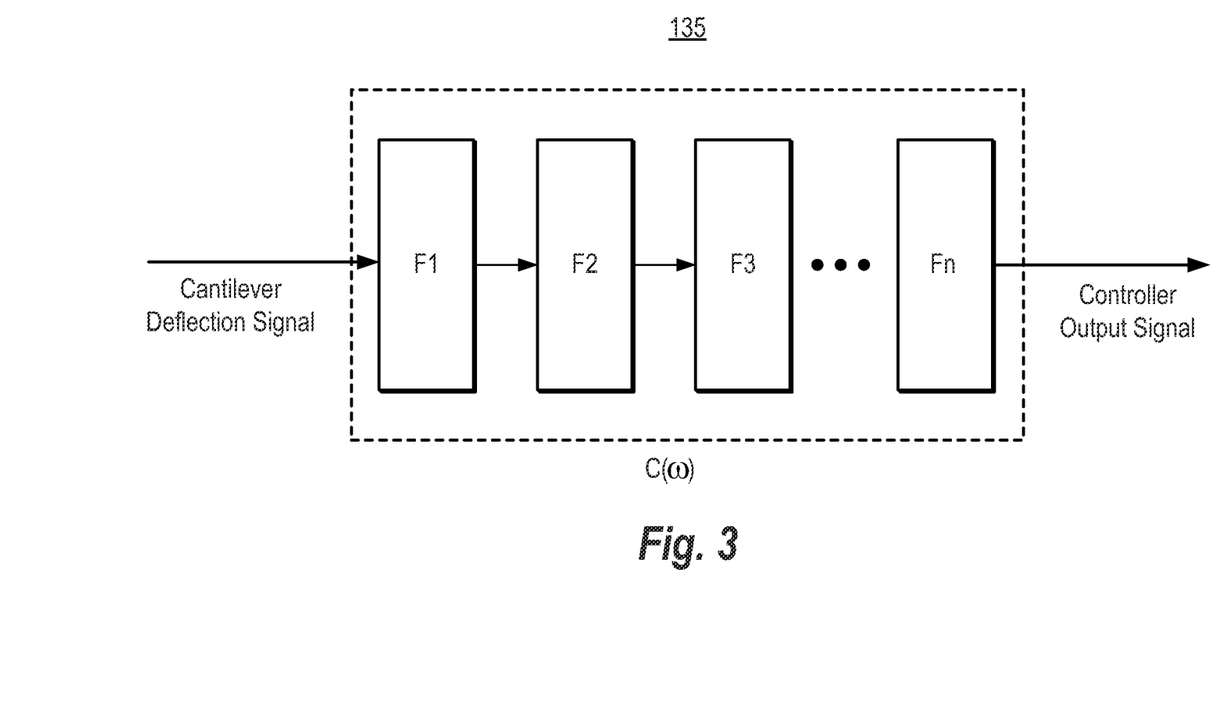
FIG. 3 is a block diagram of an AFM controller in the AFM of FIG. 1 according to a representative embodiment.

FIG. 3 is a block diagram of controller 135 in AFM 100 according to a representative embodiment. This embodiment represents one way of implementing controller 135 so that $C(\omega)$ can be tuned to address higher order resonances.

Referring to FIG. 3, controller 135 comprises "n" digital filters F1, F2, F3, . . . , Fn. These filters are arranged in a cascaded fashion, and each of them can be represented by a plurality of coefficients. Examples of cascaded filter arrangements for an AFM controller are described in a commonly owned International Application PCT/US11/26555, filed on Feb. 28, 2011, entitled "Multiple Filters in Fixed Point Math" to D. Abramovitch and C. Moon, the subject matter of which is hereby incorporated here by reference. In one example, one or more of the filters can be a PID filter, which is typically represented by three coefficients. Other filters can be biquadratic filters, which can be represented by four coefficients each. Controller 135 is tuned using a method that optimizes the value of all controller coefficients with respect to some design goal. This can be performed by tuning the filters either simultaneously or at different times, e.g., in an iterative process, to achieve a desired loop response $L(\omega)$.

Figure 4:
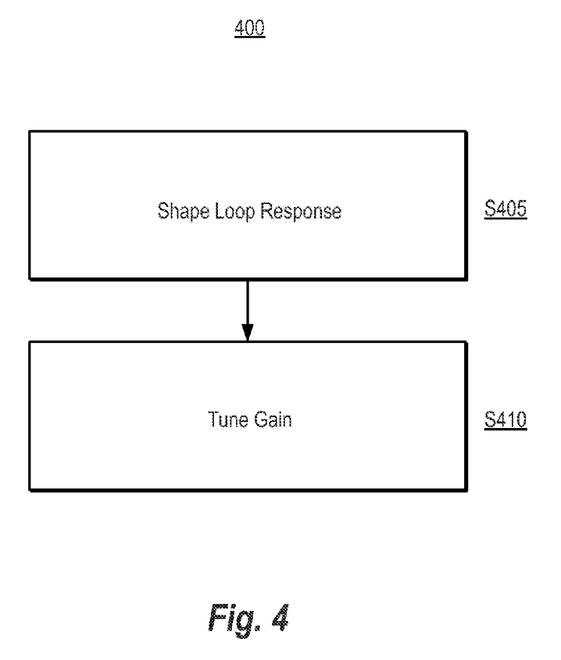
FIG. 4 is a flowchart illustrating a method of tuning an AFM controller according to a representative embodiment.

FIG. 4 is a flowchart illustrating a method of tuning an AFM controller according to a representative embodiment. For convenience, the method of FIG. 4 will be described with reference to AFM 100 of FIG. 3. In the description that follows, example method steps will be indicated by parentheses (SXXX) to distinguish them from example system or device features.

Figure 5:
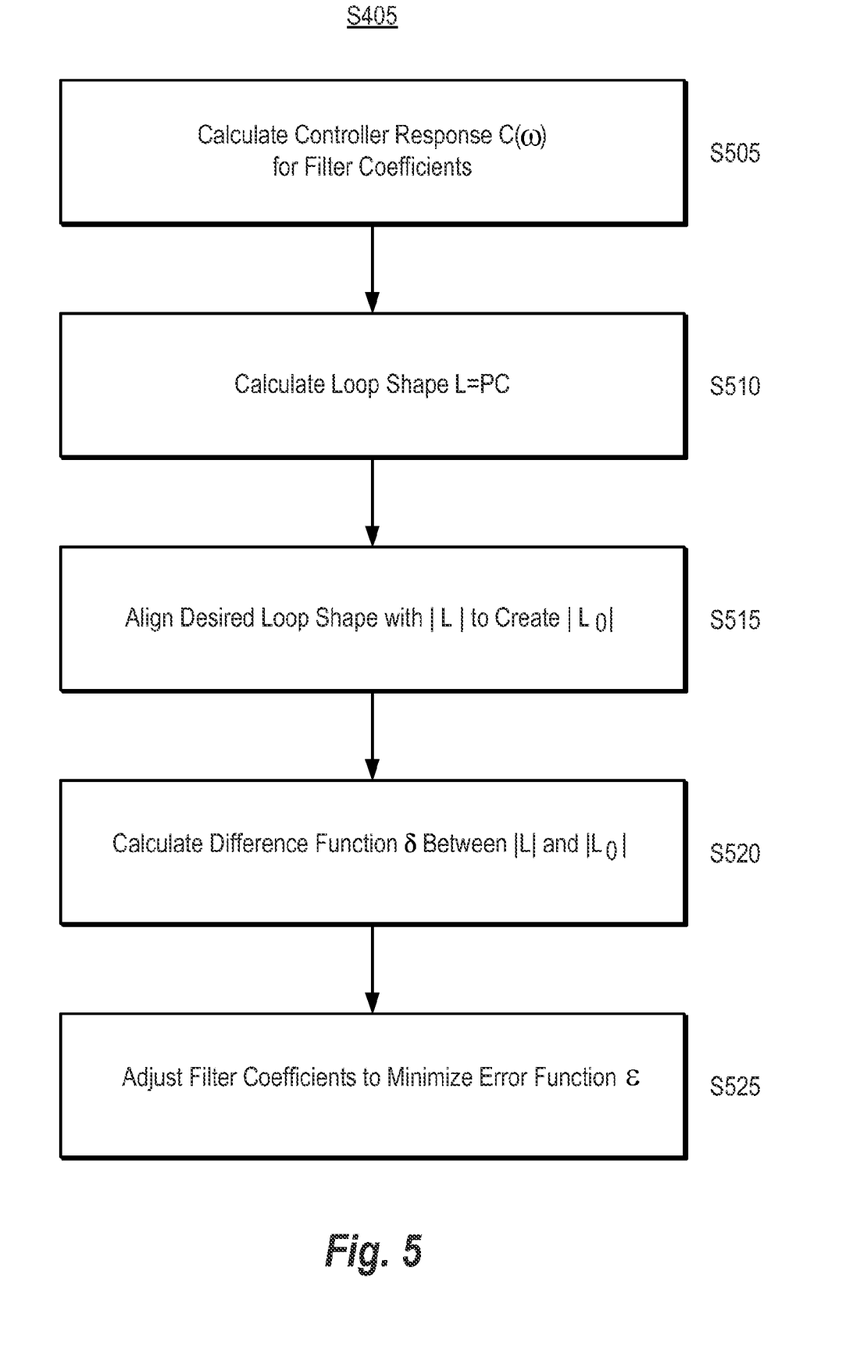
FIG. 5 is a flowchart illustrating a method of shaping a loop response of an AFM in the method of FIG. 4 according to a representative embodiment.
Figure 6:
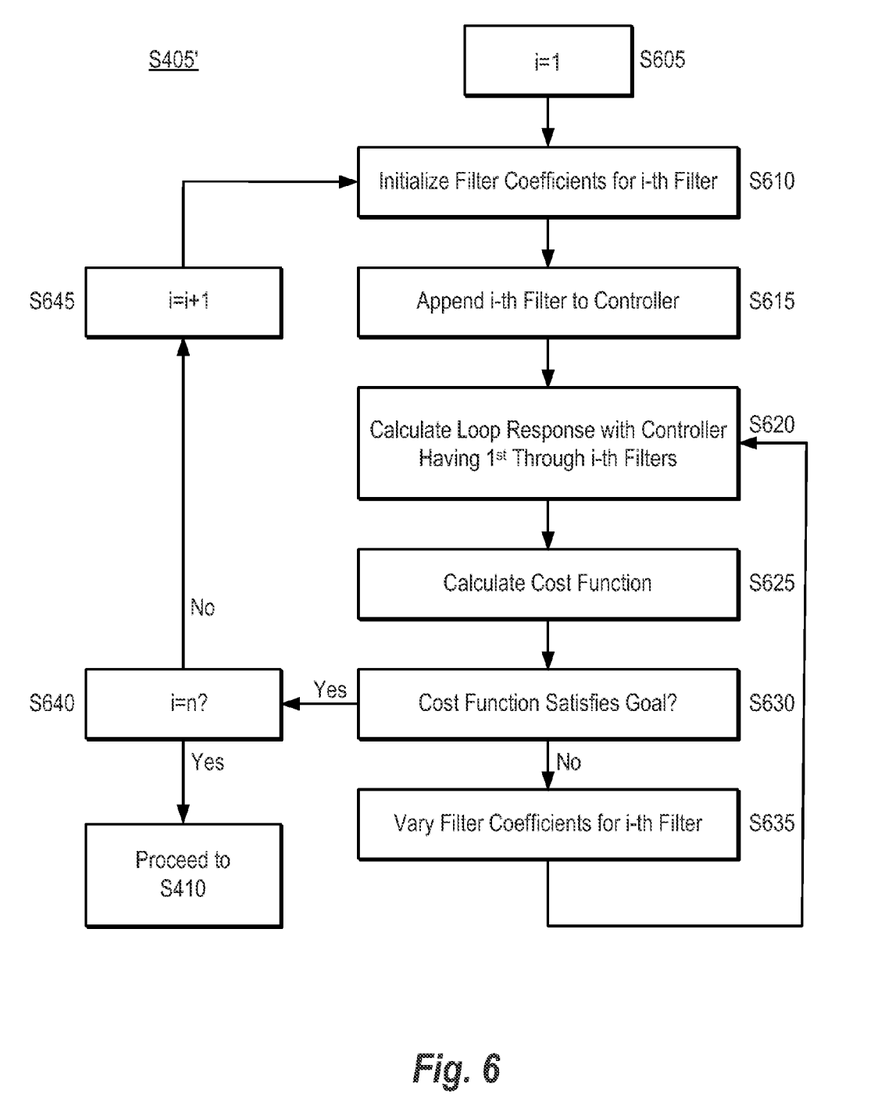
FIG. 6 is a flowchart illustrating a variation of the method of FIG. 5 according to a representative embodiment.

Referring to FIG. 4, the method begins by shaping the loop response $L(\omega)$ to match a desired loop shape (S405). When this loop shaping is performed, it is assumed that the frequency response $P(\omega)$ of system 205 has been measured accurately, and that controller 135 has a known architecture, i.e., it comprises a known set of filters and initial filter coefficients. Accordingly, the loop shaping is performed by adjusting the filter coefficients to minimize a target response characteristic such as a magnitude difference between $L(\omega)$ and $L_0(\omega)$, as described above. Different examples of how this loop shaping can be accomplished are shown in FIGS. 5 and 6. In general, the loop shaping can be performed by an automatic loop shaping component such as a CPU, reconfigurable hardware, custom hardware, or other computational apparatus.

Figure 9:
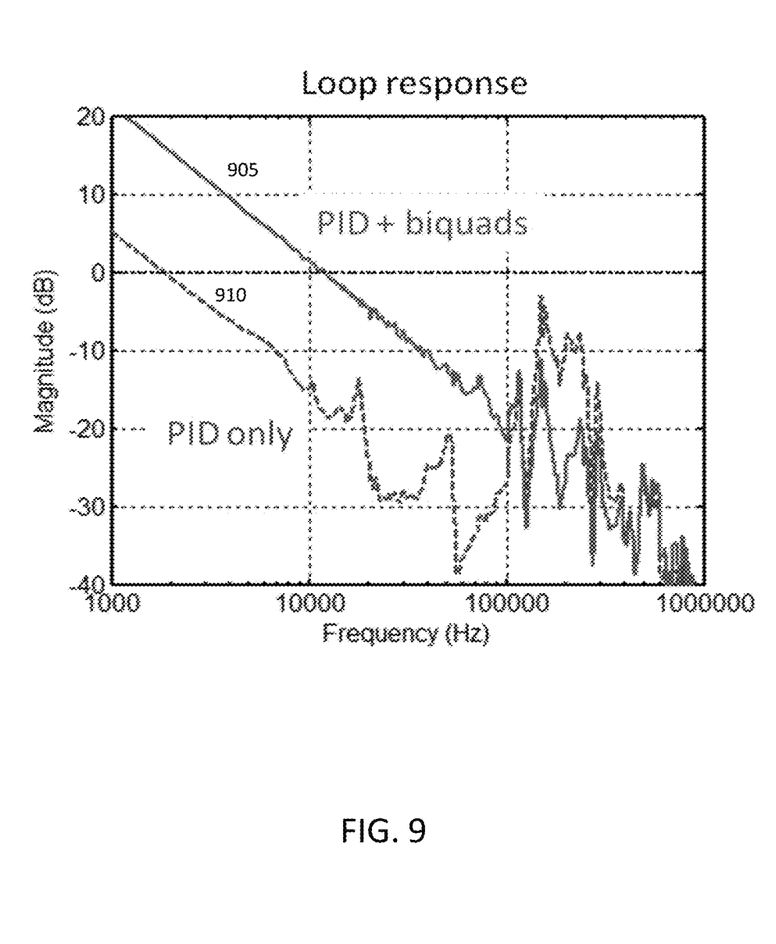
FIG. 9 is a graph illustrating a loop response of an AFM in which multiple tuned biquadratic filters have been appended to a controller according to a representative embodiment.
Figure 10:
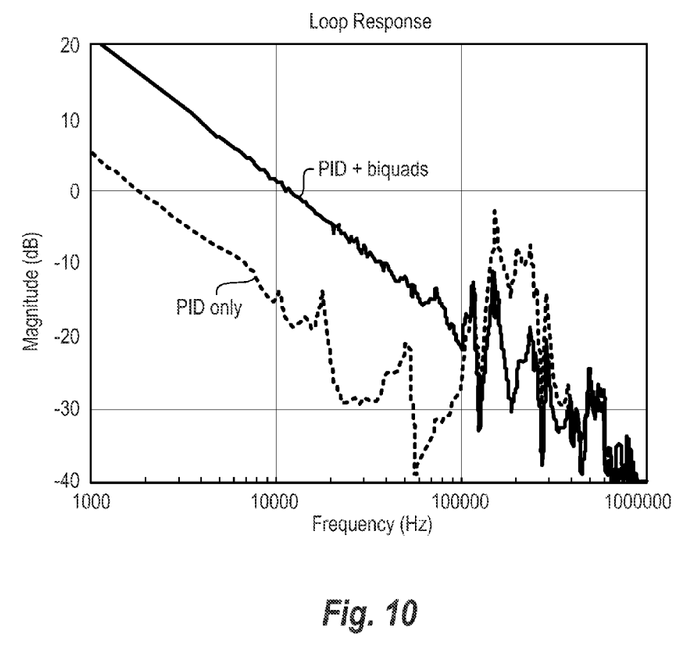

After the loop response has been shaped, the gain of controller 135 is adjusted to achieve some design goal and/or given robustness margin (S410). An example of this gain adjustment is illustrated in FIG. 9, which shows the net effect of many loop shaping and gain adjustment iterations, as will be described further below. In some embodiments, the gain is adjusted such that a magnitude of the loop response is lower than a predefined gain margin where a phase of the loop response is less than or equal to $-180°$. In some embodiments, the gain is adjusted such that a phase of the loop response is greater than a predefined phase margin minus $180°$ where a magnitude of the loop response is greater than or equal to one. In general, the gain adjustment can be performed by a gain adjustment component such as a CPU, reconfigurable hardware, custom hardware, or other computational apparatus. Moreover, the gain adjustment can be formed by the same apparatus as the automatic loop shaping.

FIG. 5 is a flowchart illustrating a method of shaping the loop response of AFM 100 in the method of FIG. 4 according to a representative embodiment. As indicated above, this method assumes that the frequency response $P(\omega)$ has been measured accurately, and that controller 135 has a known architecture. Moreover, it will be assumed that the filter coefficients of controller 135 have been set to initial values. As will be described below with reference to FIG. 7, there are ways of intelligently initializing the filter coefficients to improve the performance of the loop shaping.

Referring to FIG. 5, the method begins by calculating the frequency response $C(\omega)$ for the initial set of filter coefficients (S505). This step is typically performed using exact discretized forms of filter equations representing the filters. Next, the method calculates a resulting loop shape using the equation $L(\omega)=P(\omega)C(\omega)$ (S510). Then, the magnitude of the calculated loop response $L(\omega)$ is aligned with a desired loop at low frequency to create an aligned response $L_0(\omega)$ (S515). In other words, aligning the magnitude of the determined loop response with the desired loop shape comprises aligning a low frequency region of the magnitude of the determined loop response with a low frequency region of the desired loop shape. An example of this low frequency alignment is illustrated by an alignment between curves 815 and 820 in FIG. 8B.

After aligning $|L(\omega)|$ and $|L_0(\omega)|$, the method calculates a magnitude difference $\delta(\omega)$ between $|L(\omega)|$ and $|L_0(\omega)|$ in decibels (dB) using the equation $\delta(\omega)=20 \log_{10}(|L(\omega)|/L_0(\omega)|)$ (S520). Finally, the method adjusts the filter coefficients to minimize a cost function $\epsilon=\text{rms}[\delta(\omega)]$ (S525).

The process of adjusting the filter coefficients can be performed in a variety of ways, including certain iterative methods. For example, in some embodiments, controller 135 comprises a PID arranged in a cascaded sequence with a plurality of biquadratic filters. In such embodiments, the PID and biquadratic filters can be tuned one at a time, with each successively tuned filter being appended onto the previously tuned filters already included in controller 135.

The PID is typically tuned by recasting it as an equation $I(1/s+P/I+(D/I)s)$, where $s=i\omega$, and P, I, and D are the PID coefficients, discretizing the equation, pulling out the integral term as an overall gain factor that will be determined later by required robustness margins, and then optimizing P/I and D/I to minimize the cost function $\epsilon$.

The biquadratic filters can be chosen so as to have 4 independent parameters and a DC gain of 1. Furthermore, a scaling factor that makes the overall gain 1 can be grouped with scaling factors from other filter sections so as to minimize latency, as described, for instance, in commonly owned International Application PCT/US11/26555, filed on Feb. 28, 2011, entitled "Multiple Filters in Fixed Point Math" to D. Abramovitch and C. Moon. The parameters of the biquadratic filters can be mapped to a frequency and quality factor (Q) as a numberator and denominator, respectively. Because the cost function $\epsilon$ may have many local minima in the space of these coefficients, and because each biquadratic may affect only a narrow frequency range, it may be beneficial to provide each biquadratic fit with an intelligent initial guess. Accordingly, the numerator and denominator frequencies can be seeded at prominent features of the magnitude difference curve $\delta(\omega)$ as illustrated, for example, by the curve 830 in FIG. 8C.

Notably, not all peaks and valleys in $\delta(\omega)$ are important, so the biquadratic filters should target frequencies where poor shaping is limiting performance of the AFM. In general, there are two ways for the attainable bandwidth to be limited. First, a peak at high frequency can cause the loop response to be unstable if the gain is increased. Second, phase can limit the gain at a crossover frequency. More specifically, the system can be phase-limited due to poor shaping near crossover or due to an unavoidable non-minimum phase.

Both of the above limitations tend to be expressed where $|L(\omega)|$ is close to 1. Moreover, below crossover, where $|L(\omega)|$ is greater than one, deviations from the intended shape will cause distortions in AFM images, so they must also be corrected even if they do not limit the AFM bandwidth. Finally, it is beneficial to avoid large peaks in a closed-loop response function $T(\omega)=L(1+L)^{-1}$ in order to prevent ringing in the output of controller 135. Based on these and other considerations, a weighting function can be designed for properly initializing the biquadratic filters. One example of such a weighting function is provided by an equation $w(\omega)=\min(|L|,1)|T|^2$.

FIG. 6 is a flowchart illustrating a variation of the method of FIG. 5 according to a representative embodiment. The embodiment of FIG. 6 is an iterative method S405' for shaping the loop response of AFM 100 in the method of FIG. 4. In addition, the method is performed with controller 135 having n filters, as illustrated, for example, in FIG. 3.

Referring to FIG. 6, the method begins by initializing an index i=1 to select a first filter in controller 135 (S605). Next, the method initializes the filter coefficients of the i-th filter (S610). In the case of a PID filter or a biquadratic filter, this initialization can be performed as described above in relation to FIG. 5.

After the filter coefficients are initialized, the method appends the i-th filter to controller 135 (S615). For example, after a first filter is appended to controller 135, the controller may have only one filter, so the controller response will be determined by the characteristics of that filter. However, a second filter can be subsequently appended to controller 135 by adding it to the first filter in a sequential fashion, e.g., as illustrated in FIG. 3, so that the controller response is determined by the combined characteristics of the first and second filters.

Next, the loop response $L(\omega)$ is calculated based on the measured frequency response $P(\omega)$ in combination with the frequency response $C(\omega)$ of controller 135 having the first through i-th filters (S620). Then, a cost function is computed with respect to the calculated loop response (S625), and the cost function is evaluated to determine whether it satisfies some goal (S630). In this case, the goal may be, for example, minimizing the cost function for controller 135 having the first through i-th filters. The cost function can be $\epsilon$, as described above, or some other similarity metric between the loop response $L(\omega)$ and a target response characteristic.

If the cost function satisfies the goal (S630=YES), the method then determines whether each of the n filters have been appended to controller 135 (S640). If not (S640=NO), the method increments the index i and returns to step S610. Otherwise (S640=YES), the method proceeds to step S410 of FIG. 4. If the cost function does not satisfy the goal (630=NO), the filter coefficients of the i-th filter are varied (S635), e.g., according to some optimization function. In other words, step S635 comprises updating the filter coefficients. Thereafter, the method returns to step S620.

Figure 7:
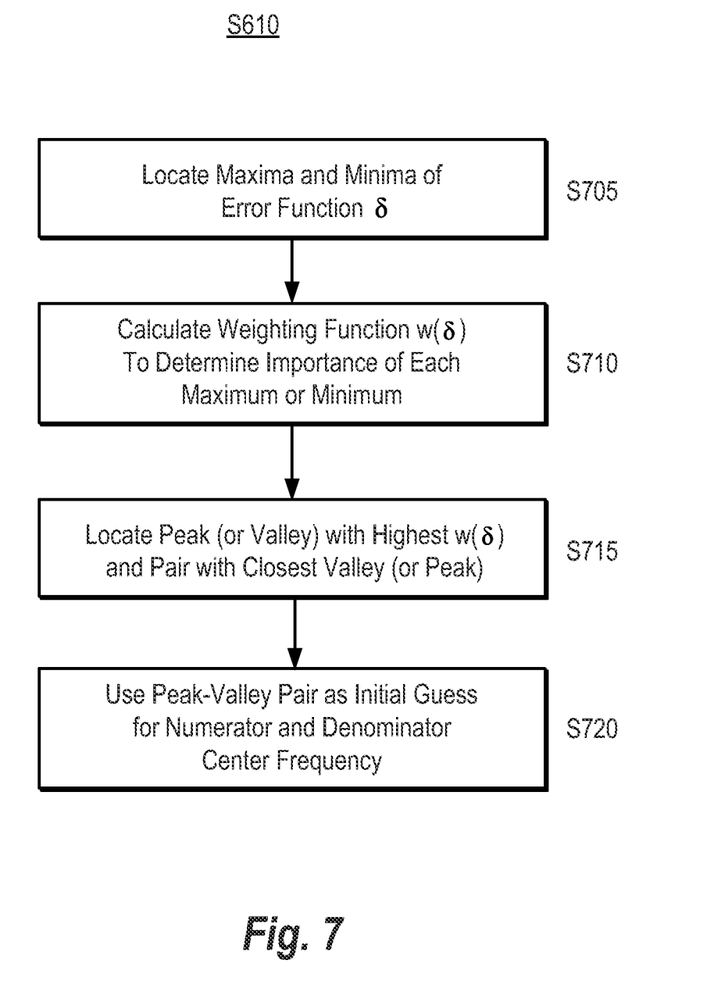
FIG. 7 is a flowchart illustrating a method of initializing filter coefficients in the methods of FIGS. 5 and 6 according to a representative embodiment.

FIG. 7 is a flowchart illustrating a method of initializing filter coefficients in the method of FIGS. 5 and 6 according to a representative embodiment. The method of FIG. 7 can be used, for instance, to generate initial guesses for the filter coefficients of biquadratic filters in step S610 of FIG. 6.

Referring to FIG. 7, the method begins by locating maxima and minima in the error function $\delta(\omega)$ (S705). For example, maxima and minima can be located in an error function such as that illustrated in the curve 825 of FIG. 8C.

Next, the method calculates the weighting function $w(\omega)$ to determine the importance of each maximum or minimum (S710), and then it locates the peak (or valley) with the highest weighted error $w(\omega)|\delta(\omega)|$ and pairs it with a closest neighboring valley (or peak) (S715). The weighting function (i.e., a weight for each of various different values of $\omega$) can be calculated as described above in relation to FIGS. 4 and 5. Finally, the method tunes the biquadratic filter using the paired peak and valley as the initial guess for its numerator and denominator center frequency (S720). In the example of FIG. 8C, a biquadratic filter having such an initial guess is illustrated by the curve 830.

FIGS. 8A through 8F are graphs illustrating various AFM characteristics related to the methods of FIGS. 5 through 7 according to representative embodiments. For convenience, the graphs of FIGS. 8A through 8F will be described as if they were generated by AFM 100 of FIG. 2.

In FIG. 8A, a curve 805 represents $|P(\omega)|$ of system 205, and a curve 810 represents $|C(\omega)|$ of controller 135 having only a PID filter. As illustrated in the curve 805, the frequency response of system 205 is full of resonances. Moreover, a single PID filter in controller 135 is too simple to counteract the resonances, even when optimally tuned using methods such as those described above. Accordingly, additional filters are added to controller 135 to address those resonances, as illustrated by FIGS. 8D through 8F.

In FIG. 8B, a curve 815 represents $|L(\omega)|$ aligned with a desired loop shape at low frequency, and a curve 820 represents $|L_0(\omega)|$, or the magnitude of the desired loop shape. $|L(\omega)|$ is calculated as a product of the two curves shown in FIG. 8A, and the desired loop shape is chosen as a simple integrator. In this example, the overall gain of controller 135 is limited at 150 kHz by a required gain margin of 3 dB. In other words, the gain of controller 135 cannot be increased without destabilizing AFM 100 because $|L(\omega)|$ approaches 0 dB at 150 kHz.

In FIG. 8C, a curve 825 represents the difference function $\delta(\omega)$ for the curves of FIG. 8B, and a curve 830 represents a biquadratic filter that has been fitted to the difference function $\delta(\omega)$. The biquadratic filter is fitted to the curve 825 by seeding its four coefficients with intelligent initial guesses such that the limiting peak at 150 kHz can be compensated, and then performing optimization on the seeded coefficients. As described above, the biquadratic filter fitted to the difference function $\delta(\omega)$ can be inverted and then appended to controller 135 to handle higher order resonances in AFM 100.

In FIG. 8D, a curve 835 represents $|P(\omega)|$ of system 205. In other words, it is the same as curve 805 in FIG. 8A. A curve 840 represents $|C(\omega)|$ of controller 135 with the PID and a biquadratic filter arranged in series as in FIG. 3. The biquadratic filter for curve 840 was generated by inverting the fitted biquadratic filter response (curve 830) to counteract resonances corresponding to the (difference) curve 825 in FIG. 8C.

In FIG. 8E, a curve 845 represents $|L(\omega)|$ derived from the curves of FIG. 8D, and a curve 850 represents $|L_0(\omega)|$ aligned with curve 845 at low frequency. Curve 850 has the same shape and slope as curve 820 of FIG. 8B, but its crossover frequency is increased by nearly 5 kHz. This shift is made possible by the fact that curve 845 does not have the same limit at 150 kHz as the curve 815 in FIG. 8B. Rather, the addition of the biquadratic filter has reduced the largest peak in curve 845 by about 20 dB compared with curve 815. Moreover, this shift corresponds to an increase in the overall gain of controller 135 by a factor of about 3.6, which allows a significant increase in the bandwidth of AFM 100. Although not shown, in the example of FIG. 8E, the new crossover frequency is constrained by the phase of $L(\omega)$ as opposed to its magnitude.

In FIG. 8F, a curve 855 represents the difference function $\delta(\omega)$ computed from the two curves in FIG. 8E. This difference curve can be used to generate another biquadratic filter by the same technique used to generate the biquadratic filters of FIGS. 8C and 8D. Moreover, the process of generating additional biquads can be repeated until a predetermined number of filters have been tuned for controller 135.

FIG. 9 is a graph illustrating a loop response of AFM 100 after multiple tuned biquadratic filters have been appended to controller 135 according to a representative embodiment. In this example, a PID filter was combined with 16 biquadratic filters in controller 135.

In FIG. 9, a curve 905 represents $|L(\omega)|$ where the PID filter and each of the 16 biquadratic filters are tuned using the method of FIG. 4, and a curve 910 represents $|L(\omega)|$ where only the PID filter in controller 135 is tuned. As illustrated by FIG. 9, the addition of 16 tuned biquadratic filters increases the feedback bandwidth of AFM 100 by nearly an order of magnitude. This can be used to significantly improve the imaging speed of AFM 100.

Note that the biquadratic filters of FIG. 9 have made the loop response match the desired integrator response closely at low frequencies and near the crossover frequency, but allow it to diverge at high frequencies where the response is small and thus unimportant. The overall gain has been limited by a requirement of 60° of phase margin, and the negative phase in the system constrains the crossover frequency below to around 12 kHz. The use of biquadratic filters which minimize time delay, as described in the International Application PCT/US11/26555, filed on Feb. 28, 2011, entitled "Multiple Filters in Fixed Point Math" to D. Abramovitch and C. Moon, allows the compensation of multiple resonances at high frequencies with minimum additional negative phase.

As described above, controller 135 can be tuned using an iterative approach or various alternative approaches. In certain alternative approaches, the PID filter and one or more biquadratic filters are re-optimized simultaneously, or multiple biquadratic filters are fit simultaneously. Moreover, in some alternative approaches, the entire controller is designed by simultaneously tuning all of the filters. Nevertheless, optimization algorithms in large parameter spaces are slow and vulnerable to falling into shallow local minima. Accordingly, iterative methods such as those described above can be used to reduce the space for a given fit and enable effective initial guesses that target limiting areas. A potential shortcoming of iterative methods is that they may fail to find a global optimum. However, there are ways to addresses this shortcoming, such as retuning each filter once, refitting it in the presence of the other filters.

Although several methods have been described for improving feedback bandwidth with respect to a height signal, or z value of a cantilever arm, these methods can be adapted or modified to improve feedback bandwidth with respect to other signals, such as x and y values of the cantilever arm, alternating current (AC) amplitude, AC frequency, and tip bias signals. Moreover, the described methods can also be adapted for use in both feedback and feed-forward controllers. In each of these adaptations, controller adjustments can be made to achieve a desired loop shape. Moreover, the above methods are not limited to AFM, and could be used to improve any feedback system that is limited by an overly simple controller.

In certain embodiments, controller 135 can be implemented in reconfigurable hardware. For example, a PID filter and multiple biquadratic filters can be programmed into an FPGA based on tuning parameters obtained on a CPU. The described embodiments, however, are not limited to specific implementations or components such as an FPGA or CPU. Rather, they can be implemented in any combination of elements capable of performing the described functionality.

While representative embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A method of tuning an atomic force microscope (AFM) comprising a physical system and a controller configured to control the physical system, the method comprising:
   determining a frequency response of the controller based on a set of filter coefficients;
   determining a loop response of the controller and the physical system based on the determined frequency response of the controller and a measured frequency response of the physical system;

aligning a magnitude of the determined loop response with a desired loop shape;

determining a value of an error function between the aligned magnitude of the determined loop response and the desired loop shape; and adjusting the set of filter coefficients to improve the value of the error function and to reduce off-surface resonance of a cantilever arm of the AFM.

2. The method of claim 1, further comprising generating an initial set of filter coefficients for a filter to be appended to the controller, comprising:

locating minima and maxima of the error function;

determining a weighting function to determine a relative importance of each of the minima and maxima;

locating one of the minima or maxima with a highest weight according to the weighting function, and pairing it with a closest maximum or minimum, respectively; and deriving the initial set of filter coefficients from the paired minimum and maximum.

3. The method of claim 1, further comprising generating a filter to be appended to the controller, comprising:

locating a maximum of the error function;

fitting a curve to a portion of the error function around the located maximum; and inverting the curve to generate a response characteristic of the filter.

4. The method of claim 3, wherein the filter is a biquadratic filter.

5. The method of claim 1, wherein the set of filter coefficients corresponds to at least one proportional-integral derivative (PID) filter and at least one biquadratic filter.

6. The method of claim 1, further comprising adjusting a gain of the controller based on a gain or phase margin of the loop response.

7. The method of claim 1, wherein aligning the magnitude of the determined loop response with the desired loop shape comprises aligning a low frequency region of the magnitude of the determined loop response with a low frequency region of the desired loop shape.

8. A system for tuning an atomic force microscope (AFM) comprising a physical system and a controller comprising a plurality of digital filters and configured to control the physical system, the system comprising:

a loop shaping component that performs automatic loop shaping on a loop response defined by a frequency response of the physical system and a frequency response of the controller, the loop shaping component configured to determine the loop response of the controller and the physical system based on a frequency response of the controller and a measured frequency response of the physical system, wherein the frequency response of the controller is determined based on a set of filter coefficients; and a gain adjustment component that adjusts a gain of the controller according to a local maximum magnitude of the loop response, wherein the controller is adapted to:

align a magnitude of the determined loop response with a desired loop shape;

determine a value of an error function between the aligned magnitude of the determined loop response and the desired loop shape; and adjust the set of filter coefficients to improve the value of the error function and to reduce off-surface resonance of a cantilever arm of the AFM.

9. The system of claim 8, wherein the loop shaping component initializes a set of filter coefficients for a filter, appends the filter to at least one other filter already included the controller, determines the loop response with the controller having the appended filter, and optimizes the set of filter coefficients with respect to the desired loop shape of the loop response.

10. The system of claim 9, wherein the filter is a biquadratic filter and the at least one other filter comprises a proportional-integral derivative (PID) filter.

11. The system of claim 8, wherein the gain adjustment component adjusts the gain of the controller such that a magnitude of the loop response is lower than a predefined gain margin where a phase of the loop response is less than or equal to −180°.

12. The system of claim 8, wherein the gain adjustment component adjusts the gain of the controller such that a phase of the loop response is greater than a predefined phase margin minus 180° where a magnitude of the loop response is greater than or equal to one.

* * * * *